Patented Mar. 24, 1953

2,632,705

UNITED STATES PATENT OFFICE 2,632,705

LECITHIN COMPOSITIONS

Albert Scharf, New York, N. Y., assignor, by mesne assignments, to American Lecithin Company, Inc., Woodside, N. Y., a corporation of Ohio No Drawing. Application June 2, 1949,
Serial No. 96,829

9 Claims. (Cl. 99—15)

1

The present invention relates to a lecithin composition and it particularly relates to a relatively dry lecithin composition.

Although the present invention is particularly described in its application to lecithin, and has a preferred application to commercial soya lecithin, it is also broadly applicable to phosphatides in general.

Lecithin is widely utilized in the food and bakery fields but it can only be handled, stored, shipped and processed with difficulty because of its stickiness and gummy texture.

It has not been found readily possible to combine lecithin with dry powdered or pulverulent carriers such as sugar, salt, flour, starch and so forth in granulated powder or other sub-divided condition, since a uniform composition cannot be obtained and the lecithin may not be evenly distributed with the powdered, granular or other sub-divided material being utilized.

Moreover, only small amounts of lecithin or other phosphatides can be conveniently incorporated in such carriers.

Usually to achieve satisfactory quantities in such mixtures, spraying procedures may be utilized. Where a spraying procedure is employed, for example where lecithin is sprayed into flour or into finely divided sugar or salt, the lecithin or other phosphatides first must be diluted with oil or other inert liquid to make it sprayable. Only then can the lecithin be mixed with the finely divided carrier, and even in this case only up to about 8% to 10% of the lecithin, at the most, may be incorporated in the carrier because of caking and formation of non-uniform mixtures.

It is among the objects of the present invention to provide a novel phosphatide or lecithin carrier composition in which the lecithin or other phosphatide may be readily combined with the carrier without spraying or dilution of the lecithin and with assurance of obtaining a uniform homogeneous mixture which may be widely used in the food, baking and other industries.

A further object is to provide a novel procedure for processing lecithin into dry, readily handled compositions by readily available mixing equipment without special precautions or techniques.

Another object is to provide a high percentage carrying dry lecithin composition which may contain up to 40 to 50% of commercial lecithin, and which permits mixtures with finely divided or granular carrier composition.

A further object is to provide novel lecithin or other phosphatide compositions in which the lecithin may be combined to form a relatively dry

2 and readily handled composition with other materials which are normally not by themselves compatible with the lecithin.

It is a particular object of the invention to provide lecithin compositions in which the lecithin is so distributed throughout the composition so as to effectively act to cover and protect the other ingredients, particularly where the other ingredients may be subject to oxidative deterioration, such as in connection with vitamin materials of the nature of carotene and fish liver oils.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory, according to one embodiment of the present invention, to combine the lecithin with a gelatinized, starchy material, and particularly gelatinized cereal, bean, fruit, nut or seed flour desirably in de-oiled condition if they are of the type known as oil-bearing seeds, fruits and nuts.

Although corn flour is preferred, it is also possible to utilize gelatinized oat, wheat, barley or other cereal flours and less preferably soya flour or even nut or seed flours, such as peanut flour, pea flour, cotton seed flour and so forth, in which the starch present has been put into the gelatinized condition.

Generally, the gelatinized material, whether it be a cereal, nut, seed or fruit, has been dried and if it is oil-containing, it has been substantially or completely de-oiled.

It has been found that such gelatinized materials may be readily combined with lecithin or other phosphatides and may be caused to take up large quantities of lecithin to form a homogeneous, uniform mixture without spraying and without special mixing and, for example, by using an ordinary cake mixer.

The resultant material may consist of from 25 to 75% of the lecithin and from 25 to 75% of the cereal flour. Preferably the gelatinized corn flour may be readily mixed with other ingredients, such as ungelatinized flour, sugar, salt, powdered soap, wood flour, powdered charcoal, silicate gel and other finely divided or powdered mixtures, before or during combination with the lecithin to assure uniform, homogenous compositions which may be readily combined with other materials and used in the food, bakery, textile, leather and other industries and generally employed as a surface active agent, an emulsifier or an anti-oxidant.

The combination of gelatinized corn flour and lecithin is particularly suitable for combination with oil-soluble vitamin preparations, such as fish liver oils, and where desired with many of these products the fish liver oil or other vitamin product may then be combined with the gelatinized corn flour and then the lecithin or phosphatides may be combined as a last step to give maximum anti-oxidative effect.

It has also been found most satisfactory to combine partial fatty acid esters of polyhydric alcohol, such as partial stearic, oleic, palmitic, lauric, myristic, linoleic linoleine and ricinoleic esters of propylene glycol, glycerol penta-erythritol, ducitol or mannitol with the combination of gelatinized flour and lecithin.

Desirably the lecithin and partial fatty acid esters, such as glyceryl mono-stearate, are first combined in hot molten condition, then mixed with the gelatinous corn flour to get a permanent, stable, homogeneous mass in which the monoglyceryl stearate will not afterwards separate and crystallize away from the lecithin in the mixture.

*Example I*

One pound of commercial soya lecithin and one half pound of glyceryl mono-stearate are melted together and mixed hot at a temperature of 125° C. with three pounds of a gelatinized corn flour.

*Example II*

100 grams of carotene dissolved in 150 grams of mineral oil. This mixture is then combined with 200 grams of gelatinized corn flour. After the mixing is completed, 100 grams of commercial soya lecithin are thoroughly mixed in.

Although gelatinized corn flour and commercial soya lecithin are preferred, gelatinized flours or other lecithins such as corn lecithin may be used with the same effect.

In lieu of the soya lecithin, other lecithins may be employed, such as corn lecithin, and a desirable lecithin is a commercial soya lecithin containing 30 to 40% of soya oil and 60 to 65% of soya phosphatides.

Although gelatinized starch itself may also be employed, it is generally preferable to use gelatinized cereal flours in dry condition, which may be mixed or containing up to 10 to 50% of other gelatinized materials, such as dried bean, seed, or nut and fruit flours, preferably in de-oiled condition.

The embodiment of the invention shown and described herein is to be considered merely as illustrative, as the invention is susceptible to variation, modification and change within the spirit and scope of the appended claims.

Having now described and ascertained the nature of the invention, and in what manner the same is to be performed, what I claim is:

1. A novel lecithin composition comprising a dry gelatinized corn flour composition and lecithin.

2. A uniform high lecithin content dry composition comprising about one part by weight of commercial soya lecithin, about ½ part by weight of glyceryl mono-stearate and about 3 parts by weight of gelatinized corn flour.

3. A uniform high lecithin content dry composition comprising commercial soya lecithin, glyceryl mono-stearate and gelatinized corn flour.

4. A uniform high lecithin content dry composition comprising about 100 parts by weight of carotene, 150 parts by weight of mineral oil, about 200 parts by weight of gelatinized corn flour and about 100 parts by weight of commercial soya lecithin.

5. A uniform high lecithin content dry composition comprising carotene, mineral oil, gelatinized corn flour and commercial soya lecithin.

6. A uniform high lecithin content dry composition comprising about 25 to 75% of lecithin and about 25 to 75% of gelatinized corn flour.

7. A uniform high lecithin content dry composition comprising commercial soya lecithin, a gelatinized cereal flour and an oil soluble vitamin.

8. A dry lecithin composition comprising lecithin and a gelatinized corn flour.

9. A dry lecithin composition comprising lecithin and a gelatinized corn flour and also containing a partial high molecular weight fatty acid ester of glycerol.

ALBERT SCHARF.

REFERENCES CITED

The following references are of record in the file of this patent:

UNITED STATES PATENTS

| Number | Name | Date |
|---|---|---|
| 1,974,915 | Giesecke | Sept. 25, 1934 |
| 2,051,257 | Holmes | Aug. 18, 1936 |
| 2,057,695 | Schwieger | Oct. 20, 1936 |
| 2,447,726 | Allingham | Aug. 24, 1948 |

FOREIGN PATENTS

| Number | Country | Date |
|---|---|---|
| 464,662 | Great Britain | Apr. 22, 1937 |